US012542768B2

(12) United States Patent
Okuda et al.

(10) Patent No.: US 12,542,768 B2
(45) Date of Patent: Feb. 3, 2026

(54) KEY EXCHANGE SYSTEM, SERVER, METHOD, AND NON-TRANSITORY COMPUTER-READABLE RECORDING MEDIUM STORING PROGRAM FOR DEPLOYING AN INTERMEDIATE SERVER BETWEEN THE KEY GENERATION DEVICE AND THE NETWORK DEVICE

(71) Applicant: NTT, Inc., Tokyo (JP)

(72) Inventors: Tetsuya Okuda, Tokyo (JP); Misato Nakabayashi, Tokyo (JP); Koji Chida, Tokyo (JP); Yuri Tanaka, Tokyo (JP); Kazuki Yamamura, Tokyo (JP); Sakae Chikara, Tokyo (JP); Kazuo Morimura, Tokyo (JP)

(73) Assignee: NTT, Inc., Tokyo (JP)

( * ) Notice: Subject to any disclaimer, the term of this patent is extended or adjusted under 35 U.S.C. 154(b) by 126 days.

(21) Appl. No.: 18/292,075

(22) PCT Filed: Aug. 25, 2021

(86) PCT No.: PCT/JP2021/031132
§ 371 (c)(1),
(2) Date: Jan. 25, 2024

(87) PCT Pub. No.: WO2023/026393
PCT Pub. Date: Mar. 2, 2023

(65) Prior Publication Data
US 2024/0364672 A1    Oct. 31, 2024

(51) Int. Cl.
*H04L 9/40*       (2022.01)
*H04L 9/08*       (2006.01)

(52) U.S. Cl.
CPC .......... *H04L 63/061* (2013.01); *H04L 9/0852* (2013.01)

(58) Field of Classification Search
USPC ...................................................... 713/171
See application file for complete search history.

(56) References Cited

U.S. PATENT DOCUMENTS

| 2006/0062392 A1* | 3/2006 | Lee ................ H04L 9/0852 380/278 |
| 2014/0101444 A1* | 4/2014 | Lee ................ H04L 63/06 713/168 |

(Continued)

OTHER PUBLICATIONS

Mikio Fujiwara, Masahide Sasaki, "3. Ryoshi-ko network gijutsu 3-1 ryoshi kagi haiso network kenkyu kaihatsu no genjo (in Japanese) (3. Quantum Optical Network Technology 3-1 Current State of Quantum Key Distribution Network Research and Development)", Research Report of National Institute of Information and Communication Technology vol. 63 No. 1 (2017), p. 9-18.

(Continued)

*Primary Examiner* — Sanchit K Sarker
(74) *Attorney, Agent, or Firm* — IPUSA, PLLC

(57) ABSTRACT

According to an embodiment, a key exchange system includes: a key generation device configured to generate a key based on quantum key exchange or post-quantum key exchange; a network device configured to perform encrypted communication with another network device by using the key; and an intermediate server deployed between the key generation device and the network device. The intermediate server includes: a state monitoring unit configured to transmit a state monitoring request to the key generation device at each predetermined time; a notification unit configured to give a push notification of key information included in a response to the state monitoring request, to the network device, when the response is received; and a key exchange unit configured to start key exchange between the network (Continued)

device and the key generation device in response to a request from the network device having received the push notification of the key information.

5 Claims, 5 Drawing Sheets

(56) References Cited

U.S. PATENT DOCUMENTS

| | | | |
|---|---|---|---|
| 2015/0271147 A1* | 9/2015 | Tanizawa | H04L 9/0852 713/171 |
| 2019/0260581 A1* | 8/2019 | Su | H04L 9/08 |
| 2021/0083865 A1* | 3/2021 | Obadia | H04L 9/0852 |

OTHER PUBLICATIONS

Colin Boyd, Gareth T. Davies, Kristian Gjosteen, and Yao Jiang. "Offline assisted group key exchange", NTNU, Norwegian University of Science and Technology, Trondheim, Norway, Information Security, Jul. 3, 2018. Springer, p. 1-23.

* cited by examiner

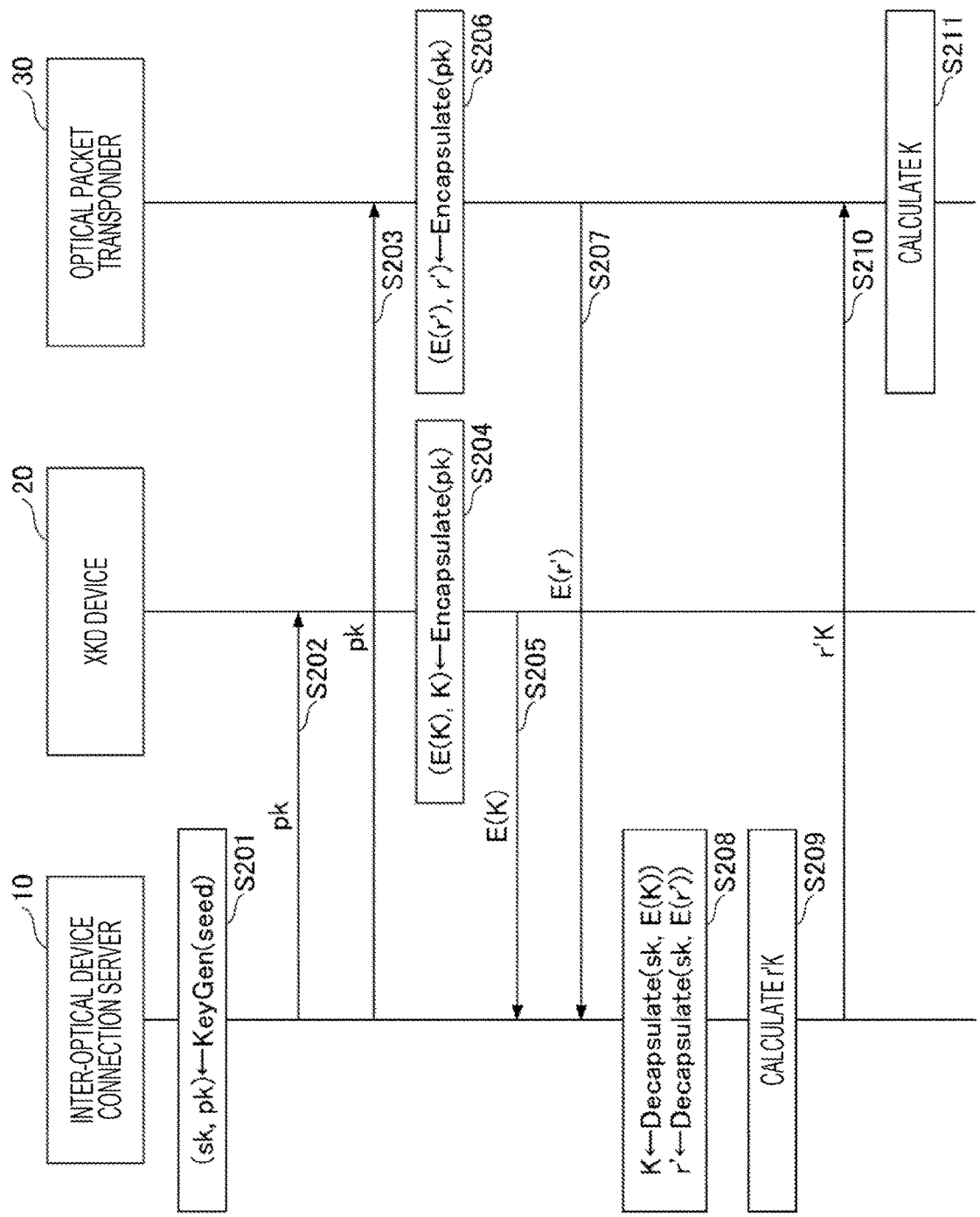

KEY EXCHANGE SYSTEM, SERVER, METHOD, AND NON-TRANSITORY COMPUTER-READABLE RECORDING MEDIUM STORING PROGRAM FOR DEPLOYING AN INTERMEDIATE SERVER BETWEEN THE KEY GENERATION DEVICE AND THE NETWORK DEVICE

TECHNICAL FIELD

The present invention relates to a key exchange system, a server, a method, and a program.

Background Art

Quantum key distribution (QKD) and post-quantum key exchange (PQKD) are known as technologies for also performing secure communication for quantum computers. By generating a key by an XKD (OKD or POKD) device as a group key and encrypting data with this key, secure encrypted communication can be implemented in a group. For example, Non-Patent Literature 1 describes a communication network that performs key exchange through quantum key exchange. For example, Non-Patent Literature 2 describes group key exchange via a server.

Citation List

Non-Patent Literature

Non-Patent Literature 1: Mikio Fujiwara, Masahide Sasaki, "3. Ryoshi-ko network gijutsu 3-1 ryoshi kagi haiso network kenkyu kaihatsu no genjo (in Japanese) (3. Quantum Optical Network Technology 3-1 Current State of Quantum Key Distribution Network Research and Development)", Research Report of National Institute of Information and Communication Technology Vol. 63 No. 1 (2017)

Non-Patent Literature 2: Colin Boyd, Gareth T. Davies, Kristian Gjosteen, and Yao Jiang. Offline assisted group key exchange. Information Security, 2018. Springer.

SUMMARY OF INVENTION

Technical Problem

In the technology of the related art, however, characteristics of a device performing key exchange are not taken into consideration. For example, when key exchange is performed between functionally constrained devices, a function of detecting an abnormality during key exchange or sending a notification for preventing a delay of key exchange cannot be implemented. On the other hand, by deploying an intermediate server that functions as a buffer that absorbs characteristics of devices performing key exchange between the devices, it is conceivable that key exchange having the above-described various functions can be implemented even between devices having functional constraints.

An embodiment of the present invention has been made in view of the foregoing circumstances, and an object of the present invention is to implement key exchange via an intermediate server that functions as a buffer for device characteristics of a key exchange target.

Solution to Problem

In order to achieve the foregoing object, a key exchange system according to an embodiment includes: a key generation device configured to generate a key based on quantum key exchange or post-quantum key exchange; a network device configured to perform encrypted communication with another network device by using the key; and an intermediate server deployed between the key generation device and the network device. The intermediate server includes: a state monitoring unit configured to transmit a state monitoring request to the key generation device at each predetermined time; a notification unit configured to give a push notification of key information included in a response to the request, to the network device, when the response is received; and a key exchange unit configured to start key exchange between the network device and the key generation device in response to a request from the network device having received the push notification of the key information.

Advantageous Effects of Invention

It is possible to implement key exchange via an intermediate server that functions as a buffer for device characteristics of a key exchange target.

BRIEF DESCRIPTION OF DRAWINGS

FIG. 5 is a sequence diagram illustrating key exchange process according to an example.

DESCRIPTION OF EMBODIMENTS

An embodiment of the present invention will be described below. In the embodiment, a key exchange system 1 capable of implementing key exchange via an intermediate server that functions as a buffer for device characteristics of a key exchange target will be described.

Overall Configuration of Key Exchange System 1

Figure 1:
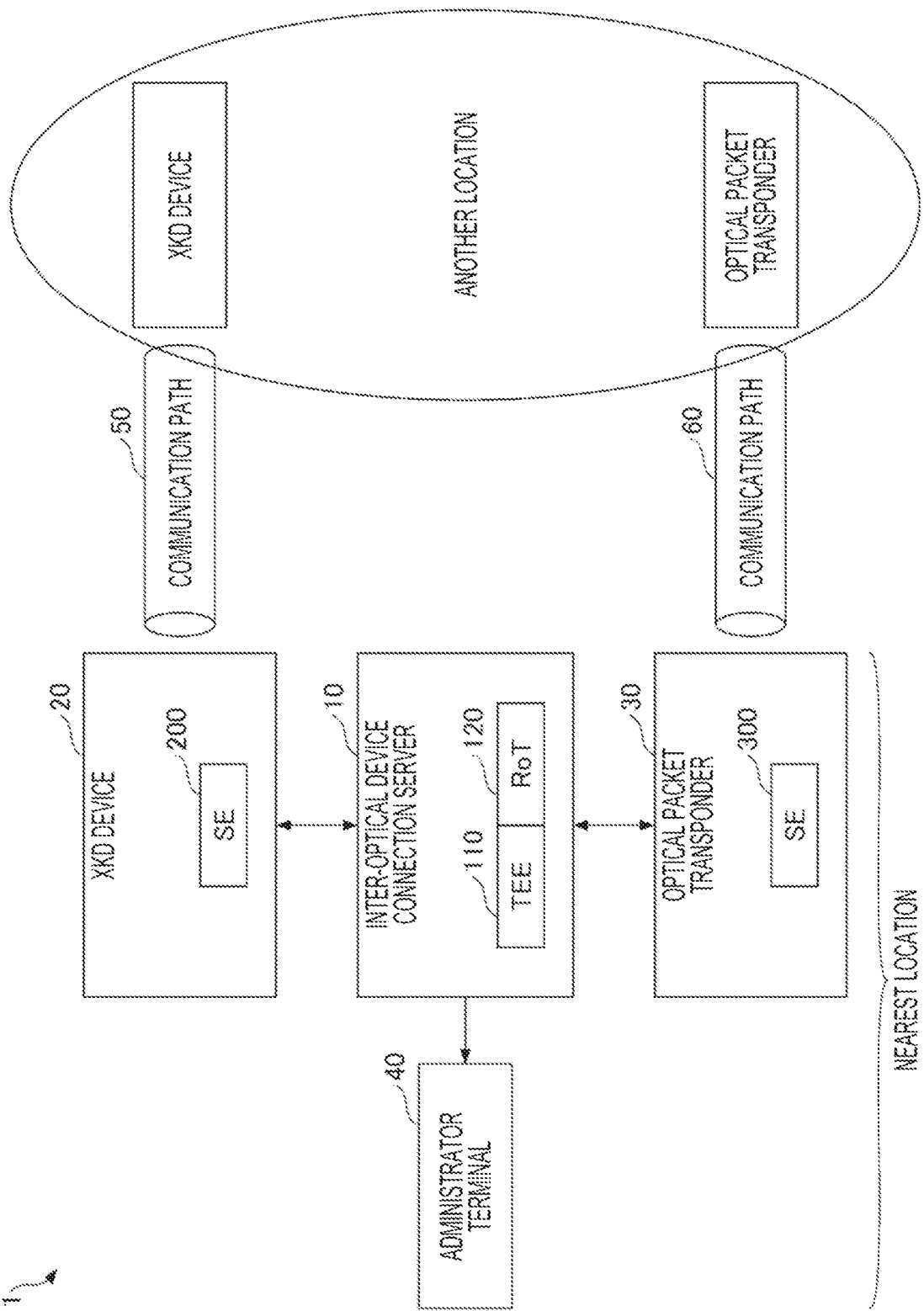
FIG. 1 is a diagram illustrating an example of an overall configuration of a key exchange system according to an embodiment.

FIG. 1 illustrates an overall configuration of the key exchange system 1 according to the embodiment. As illustrated in FIG. 1, the key exchange system 1 according to the embodiment includes an inter-optical device connection server 10, an XKD device 20, an optical packet transponder 30, and an administrator terminal 40. The inter-optical device connection server 10 and the XKD device 20, the inter-optical device connection server 10 and the optical packet transponder 30, and the inter-optical device connection server 10 and the administrator terminal 40 are connected to be able to communicate with each other via a communication network.

The inter-optical device connection server 10 is a server deployed between the XKD device 20 and the optical packet transponder 30, and functions as an orchestrator related to key exchange for the optical packet transponder 30 situated at the nearest location to perform encrypted communication with an optical packet transponder situated at another location. That is, the inter-optical device connection server 10 monitors the state of the XKD device 20 situated at the nearest location to acquire key information (for example, key ID, key policy (key update time, expiration date, or the like), key exchange method (QKD or PQKD), or the like), and gives a push notification of the key information to the optical packet transponder 30 and administrator terminal 40 situated at the nearest location. Accordingly, the optical packet transponder 30 (and the administrator using the administrator terminal 40) can perform key exchange (also including key update) with inhibited delay.

The inter-optical device connection server 10 includes a trusted execution environment (TEE) 110 and a root of trust (RoT) 120.

The TEE 110 is a secure area that has a function such as "presence of an enclave that cannot be tampered with". Accordingly, it is guaranteed that there is no leakage to the outside of an enclave such as an operating system (OS) in the enclave. The TEE implemented by some processors further has functions such as "there is a secure module in the enclave without a secret key being leaked" and "establishment of an end-to-end (E2E) secure channel between a user and the enclave" (remote attestation (RA)). It is assumed that the TEE 110 included in the inter-optical device connection server 10 according to the embodiment has the foregoing functions, and an RA is used when key exchange is performed between the XKD device 20 and the optical packet transponder 30 via the inter-optical device connection server 10. Further, RA implements a secure E2E channel by establishing a transport layer security (TLS) session. In this TLS, it is assumed that a common key is also exchanged in accordance with a secure key exchange algorithm for a quantum computer. Accordingly, even if the owner of the physical server of the inter-optical device connection server 10 has malice, man-in-the-middle (MitM) attack or the like can be prevented.

The RoT 120 is a secure element (SE) that serves as a starting point of trust between an SE 200 included in the XKD device 20 and an SE 300 included in the optical packet transponder 30. The RoT 120 stores, for example, an attestation signature key.

The XKD device 20 generates a key K for the optical packet transponder 30 situated at the nearest location, to perform encrypted communication with an optical packet transponder situated at another location, by QKD or POKD (also collectively referred to as "XKD"). The key K is shared with the XKD device at another location via a secure communication path 50. Here, the XKD device 20 according to the embodiment (and an XKD device at another location) is assumed to be a dedicated device or apparatus that does not have an advanced function such as a push notification function (that is, a device or an apparatus that has functional constraints as a characteristic of the XKD device 20 is assumed).

The XKD device 20 includes an SE 200. The SE 200 stores, for example, its own signature key or the like.

The optical packet transponder 30 is a network device or apparatus that performs encrypted communication (encrypted optical packet communication) with the optical packet transponder 30 at another location via the communication path 60 using the key K generated by the XKD device 20. The optical packet transponder 30 situated at the nearest location and the optical packet transponder situated at another location serve as clients in a group key exchange. Here, the optical packet transponder 30 according to the embodiment (and an optical packet transponder at another base) is assumed to be a dedicated device or apparatus that does not have an advanced function such as a push notification function (that is, a device or an apparatus that has functional constraints as characteristics of the optical packet transponder 30 is assumed).

The optical packet transponder 30 includes an SE 300. The SE 300 stores, for example, its own signature key or the like.

The administrator terminal 40 is a terminal used by the administrator of the XKD device 20 and the optical packet transponder 30.

Although not illustrated, there is an inter-optical device connection server at another location, which functions as an orchestrator related to key exchange between the XKD device and the optical packet transponder situated at another location, similarly to the inter-optical device connection server 10 situated at the nearest location.

Although not illustrated, there is a public key infrastructure (PKI) that manages a public key corresponding to the attestation signature key and public keys corresponding to the signature keys of the XKD device 20 and the optical packet transponder 30. Furthermore, it is assumed that the public key infrastructure supports a signature algorithm that is secure even for a quantum computer.

<Hardware Configuration of Inter-Optical Device Connection Server 10>

Figure 2:
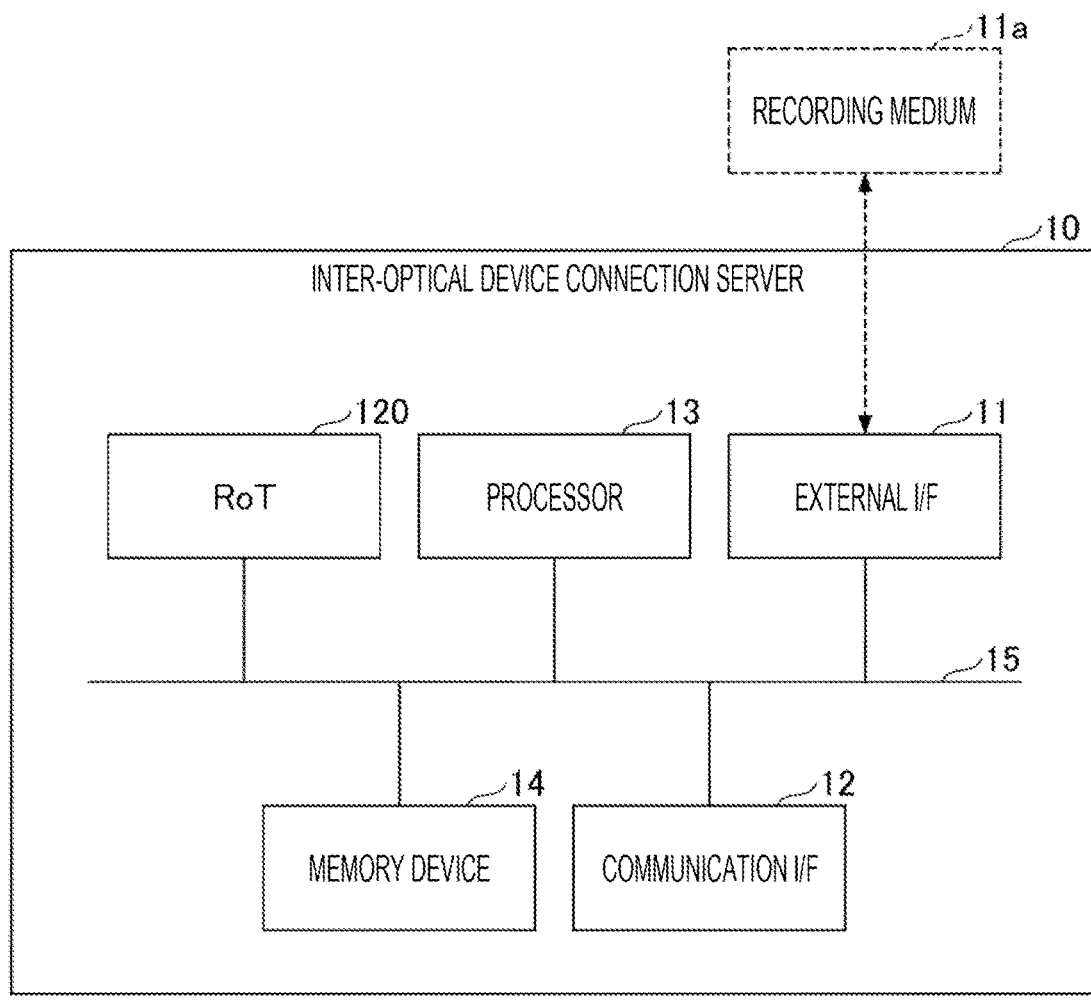
FIG. 2 is a diagram illustrating an example of a hardware configuration of the inter-optical device connection server according to the embodiment.

FIG. 2 illustrates a hardware configuration of the inter-optical device connection server 10 according to the embodiment. As illustrated in FIG. 2, the inter-optical device connection server 10 according to the embodiment includes an external I/F 11, a communication I/F 12, a processor 13, a memory device 14, and an RoT 120. These hardware units are connected to be able to communicate with each other via a bus 15.

The external I/F 11 is an interface with an external device such as a recording medium 11*a*. Examples of the recording medium 11*a* include a compact disc (CD), a digital versatile disk (DVD), a secure digital memory card (SD memory card), and a universal serial bus (USB) memory card.

The communication I/F 12 is an interface for connecting the inter-optical device connection server 10 to the communication network. The processor 13 is, for example, any of various arithmetic devices such as a central processing unit (CPU) capable of implementing the TEE 110. The memory device 14 is, for example, any of various storage devices such as a hard disk drive (HDD), a solid state drive (SSD), a flash memory, a random access memory (RAM), and a read only memory (ROM).

The hardware configuration of the inter-optical device connection server 10 illustrated in FIG. 1 is an example. Additionally, for example, an input device such as a keyboard, a mouse, or a touch panel may be included, a display device such as a display or a display panel may be included, or various other types of hardware may be included.

<Functional Configuration of Key Exchange System 1>

Figure 3:
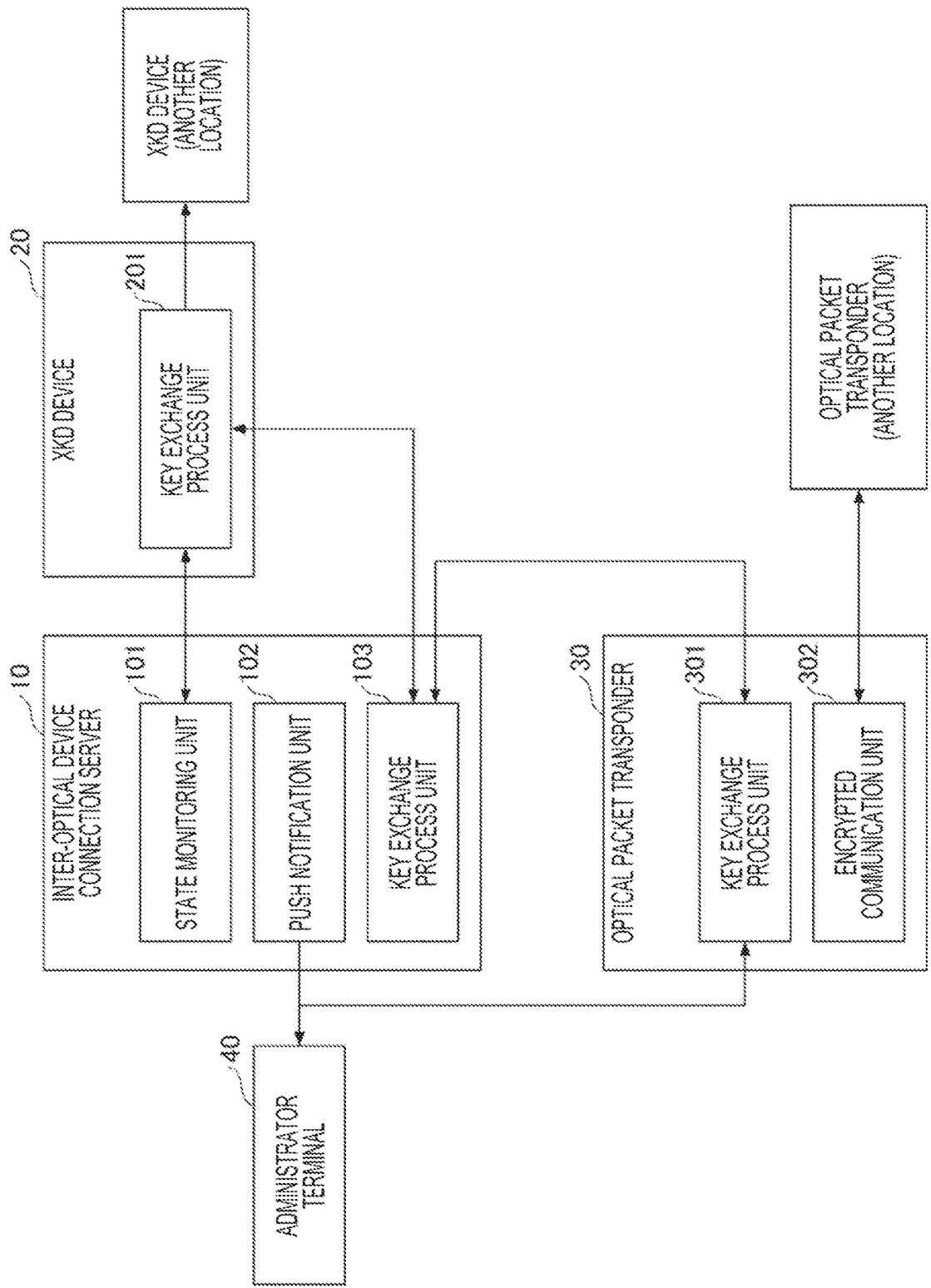
FIG. 3 is a diagram illustrating an example of a functional configuration of the key exchange system according to the embodiment.

A functional configuration of the key exchange system 1 according to the embodiment is illustrated in FIG. 3. As illustrated in FIG. 3, the inter-optical device connection server 10 according to the embodiment includes a state monitoring unit 101, a push notification unit 102, and a key exchange process unit 103. The XKD device 20 according to the embodiment includes a key exchange process unit 201. The optical packet transponder 30 according to the embodiment includes a key exchange process unit 301 and an encrypted communication unit 302.

The state monitoring unit 101 monitors the state of the XKD device 20, and performs key information generation or the like from the XKD device 20, as a result of state monitoring. When the XKD device 20 generates the key K based on QKD, the state monitoring unit 101 also acquires information (hereinafter also referred to as intercepting detection information) indicating a detection result of intercepting or wiretapping as a result of state monitoring. Since intercepting and wiretapping can be detected based on QKD as described in Non-Patent Literature 1, the XKD device 20 has an intercepting and wiretapping detection function when the key K is generated based on QKD.

The push notification unit 102 gives a push notification of information (key information, intercepting detection information, and the like) obtained as a result of state monitoring by the state monitoring unit 101, to the optical packet transponder 30 and the administrator terminal 40.

The key exchange process unit 103 performs various processes for exchanging the key K between the XKD device 20 and the optical packet transponder 30 (in other words, the key K generated by the XKD device 20 is delivered to the optical packet transponder 30).

In response to a request from the inter-optical device connection server 10, the key exchange process unit 201 generates the key K and performs various processes for delivering the key K to the optical packet transponder 30. The key exchange process unit 201 also performs various processes for delivering the key K to the XKD device situated at another location.

The key exchange process unit 301 performs various processes for obtaining the key K generated by the XKD device 20. The key exchange process unit 201 requests the inter-optical device connection server 10 to exchange a key based on the information pushed and notified from the inter-optical device connection server 10. When the optical packet transponder 30 holds the key K and the key K is updated to a new key K, the key exchange may be referred to as key update.

The encrypted communication unit 302 performs encrypted communication using the key K, with the optical packet transponder situated at another location.

<Overall Processing of Key Exchange System 1>

Figure 4:
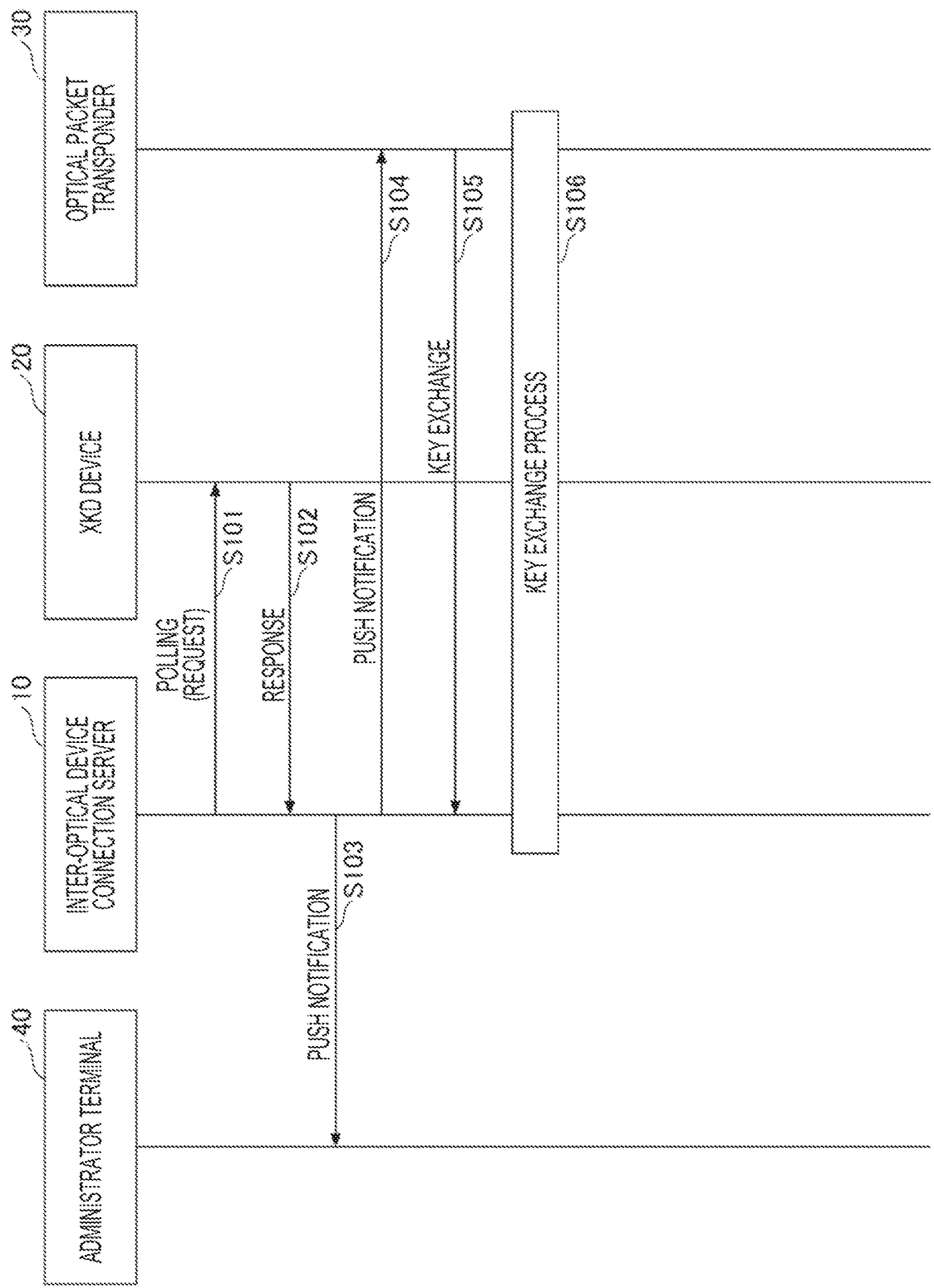
FIG. 4 is a sequence diagram illustrating an example of overall processing of the key exchange system according to the embodiment.

An overall process of the key exchange system 1 according to the embodiment will be described with reference to FIG. 4.

The state monitoring unit 101 of the inter-optical device connection server 10 performs state monitoring by polling requests (that is, by transmitting requests at each predetermined time) to the XKD device 20 (step S101). The state monitoring unit 101 transmits requests asynchronously through, for example, pub/sub communication or the like. The state monitoring unit 101 may transmit requests by using, for example, a representational state transfer application programming interface (REST API) provided by the XKD device 20.

The key exchange process unit 201 of the XKD device 20 returns a response to a request from the inter-optical device connection server 10 (step S102). The response includes, for example, key information. When the XKD device 20 generates the key K based on QKD, intercepting detection information or the like detected by an intercepting or wiretapping detection function may be included.

The state monitoring unit 101 of the inter-optical device connection server 10 caches the response returned in step S102 in the TEE 110, and performs a push notification to the administrator terminal 40 and the optical packet transponder 30 (steps S103 and S104). The state monitoring unit 101 may give the push notification to the administrator terminal 40 and the optical packet transponder 30 immediately after the response returned in step S102 is cached, as described above, or may give the push notification to the administrator terminal 40 and the optical packet transponder 30 after a certain period of time has passed. The push notification to the optical packet transponder 30 may not include intercepting detection information. The state monitoring unit 101 may transmit the push notification to the optical packet transponder 30 by using, for example, an API called a transponder abstraction interface (TAI) adapter provided by the optical packet transponder 30.

An administrator or the like using the administrator terminal 40 can know the key information and the intercepting detection information by receiving the push notification from the inter-optical device connection server 10. That is, the administrator or the like can know, for example, key ID, key policy (key update time, expiration date, or the like), key exchange method (QKD or the PQKD), whether to detect intercepting or wiretapping, and the like. When the administrator knows the key policy, the administrator can also instruct, for example, the optical packet transponder 30 to update the key K held by the optical packet transponder 30.

The key exchange process unit 301 of the optical packet transponder 30 caches the key information included in the push notification transmitted in step S104 described above, and requests the inter-optical device connection server 10 to exchange the keys (step S105). The key exchange process unit 301 asynchronously transmits a request through, for example, pub/sub communication or the like. That is, the key exchange process unit 301 may request the inter-optical device connection server 10 to exchange the key immediately after the key information included in the push notification transmitted in step S104 is cached, as described above, or may request the inter-optical device connection server 10 to exchange the key after a certain period of time has passed.

Subsequently, a key exchange process is performed between the XKD device 20 and the optical packet transponder 30 via the inter-optical device connection server 10 (step S106). Through this key exchange process, key exchange is performed according to QKD or PQKD protocol.

Example of Key Exchange Process

Hereinafter, as an example of the key exchange process in step S106 described above, a case where key exchange (post-quantum key exchange (PQKD)) based on NTRU encryption, which is a type of lattice-based encryption scheme, is performed will be described.

<<Preparation>>

First, some symbols are prepared. For details of the symbols to be described below and various algorithms to be described below, refer to, for example, Reference Literature 1 or the like.

$\Phi_n := x^n - 1$ $\Phi_n' := x^0 + x^1 + \ldots + x^{n-1}$ mod(p, f):=operation on $Z_p[x]/(f)$ $D_r$:=domain of parameter r $D_m$:=domain of parameter m $Sample_{fg}$:=generator of f and g $Sample_{rm}$:=generator of r and m $H_1, H_2$:=cryptographic hash function <<Key Exchange Process>>

The key exchange process according to an example will be described with reference to FIG. 5.

When the key exchange request is received from the optical packet transponder 30, the key exchange process unit 103 of the inter-optical device connection server 10 generates and outputs a secret key sk and a public key pk by (sk, pk)←KeyGen (seed) (step S201).

Here, the seed is used to generate a key, and the KeyGen algorithm generates a key pair (sk, pk) by the following steps 1-1 to 1-4.

Step 1-1: ((f, $f_p$, $h_q$), h)←NTRUKeyGen (seed)
Step 1-2: s←$^\${0, 1\}^{256}$
Step 1-3: (sk, pk)←((f, $f_p$, $h_q$, S), h)
Step 1-4: output (sk, pk)

Here, s←$^\${0, 1\}^{256}$ indicates that s is uniformly and randomly selected from $\{0,1\}^{256}$. The NTRUKeyGen algorithm generates and outputs ((f, $f_p$, $h_q$), h) through the following Step 2-1 to Step 2-6.

Step 2-1: (f,g)←Sample$_{fg}$ (seed)
Step 2-2: $f_q$←$f^{-1}$ mod(q,$\Phi_n'$)
Step 2-3: h←(3·g·$f_q$)mod(q,$\Phi_n$)
Step 2-4: $h_q$←$h^{-1}$ mod(q,$\Phi_n'$)
Step 2-5: fp←$f^{-1}$ mod(3,$\Phi_n'$)
Step 2-6: output ((f, $f_p$, $h_q$), h)

Next, the key exchange process unit 103 of the inter-optical device connection server 10 transmits the public key pk to the XKD device 20 and the optical packet transponder 30 (steps S202 to S203). At this time, the key exchange process unit 103 transmits the public key pk based on RA after a signature is added by using the attestation signature key.

When the public key pk is received from the inter-optical device connection server 10, the key exchange process unit 201 of the XKD device 20 verifies the signature. If the verification is successful, the key K and the encryption E(K) are generated by (E(K),K)←Encapsulate (pk) (step S204).

Here, an Encapsulate algorithm generates and outputs (E(K),K) in the following step 3-1 to 3-6.

Step 3-1: coins←$^\${0, 1\}^{256}$
Step 3-2: (r,m)←Sample$_{rm}$ (coins)
Step 3-3: c←NTRUEncrypt (pk,(r,m))
Step 3-4: k←$H_1$(r,m)
Step 3-5: (E(K),K)←(c,k)
Step 3-6: output (E(K),K)

Here, coins←$^\${0,1\}^{256}$ indicates that coins are uniformly and randomly selected from $\{0,1\}^{256}$. The NTRUEncrypt algorithm generates and outputs c in the following steps 4-1 to 4-3.

Step 4-1: m'←Lift (m)
Step 4-2: c←(r·pk+m')mod(q,$\Phi_n$)
Step 4-3: output c

Lift is a function or an operation used in NTRU encryption.

Then, the key exchange process unit 201 of the XKD device 20 transmits E(K) generated in step S204, as described above, to the inter-optical device connection server 10 (step S205). At this time, the key exchange process unit 201 transmits E(K) based on RA after a signature is added by using its own signature key.

When the public key pk is received from the inter-optical device connection server 10, the key exchange process unit 301 of the optical packet transponder 30 verifies the signature. If the verification is successful, the key r' and its encryption r' (K) are generated by (E(r'),r')←Encapsulate (pk) (step S206).

Here, the Encapsulate algorithm generates and outputs (E(r'),r') in the following steps 5-1 to 5-6.

Step 5-1: coins←$^\${0, 1\}^{256}$
Step 5-2: (r,m)←Sample$_{rm}$ (coins)
Step 5-3: c←NTRUEncrypt (pk,(r,m))
Step 5-4: k←$H_1$ (r,m)
Step 5-5: (E(r'),r')←(c,k)
Step 5-6: output (E(r'),r')

Then, the key exchange process unit 301 of the optical packet transponder 30 transmits E(r') generated in step S205, as described above, to the inter-optical device connection server 10 (step S207). At this time, the key exchange process unit 201 transmits E(r') based on RA after a signature is added by using its own signature key.

When E(K) and E(r') are received from the XKD device 20 and the optical packet transponder 30, respectively, the key exchange process unit 103 of the inter-optical device connection server 10 verifies each signature. If the verification is successful, E(K) and E(r') are decrypted by K←Decapsulate (sk, E(K)) and r'←Decapsulate (sk, E(r')) (step S208).

Here, the Decapsulate algorithm generates K or r' by the following steps 6-1 to 6-4. Hereinafter, c is one of E(K) or E(r').

Step 6-1: (r,m, fail)←NTRUDecrypt ((f, $f_p$, $h_q$), c)
Step 6-2: $k_1$←$H_1$(r,m)
Step 6-3: $k_2$←$H_2$(s,c)
Step 6-4: If fail=0, output $k_1$ otherwise output $k_2$.

Accordingly, when fail=0 (that is, when the decryption is successful), $k_1$=K is obtained when c is E(K), and $k_1$=r' is obtained when c is E(r').

Here, the NTRUDecrypt algorithm generates and outputs (r, m, fail) in the following steps 7-1 to 7-6.

Step 7-1: If c≠0 mod(q,$\Phi_n$), output (0,0,1).
Step 7-2: a←(c·f)mod(q,$\Phi_n$)
Step 7-3: m←(a·$f_p$)mod(3,$\Phi_n'$)
Step 7-4: m'←Lift (m)
Step 7-5: r←((c−m'·$h_q$))mod(q,$\Phi_n'$)
Step 7-6: If (r,m)∈$D_r$×$D_m$, output (r,m,0), otherwise output (0,0,1)

Next, the key exchange process unit 103 of the inter-optical device connection server 10 calculates r'K (step S209).

Then, the key exchange process unit 103 of the inter-optical device connection server 10 transmits r'K calculated in step S209, as described above, to the optical packet transponder 30 (step S210). At this time, the key exchange process unit 103 adds a signature with an attestation signature key, and then transmits r'K based on RA.

When r'K is received from the inter-optical device connection server 10, the key exchange process unit 301 of the optical packet transponder 30 decrypts r'K by using r' held by the optical packet transponder 30 and obtains K (step S211). Accordingly, the encrypted communication unit 302 of the optical packet transponder 30 can perform encrypted communication with the optical packet transponder situated at another location by using the key K.

CONCLUSION

As described above, in the key exchange system 1 according to the embodiment, the inter-optical device connection server 10 including the TEE 110 functions as a buffer (in particular, a buffer for key pooling and on-demand key exchange) that absorbs characteristics of the XKD device 20 and the optical packet transponder 30, and distributes the key K generated by the XKD device 20 to the optical packet transponder 30 via the inter-optical device connection server 10. Accordingly, it is possible to safely configure a key exchange protocol on the honest assumption based on the semi-honest assumption. As a result, for example, even when the group key K is shared by a large number of optical packet transponders 30, a group key exchange protocol for the sharing is not complicated. It is possible to implement a system configuration in which more information than is necessary is not passed to the inter-optical device connection server 10 while reducing the calculation cost. In particular, since calculation cost of each client (an optical packet transponder) does not increase with the number of clients, scalability can be maintained.

Even if the owner of the physical server of the inter-optical device connection server 10 has malice (for example, the OS is malicious), access to the TEE 110 cannot be made and leakage of the secret keys r' and K can be prevented.

Further, the inter-optical device connection server 10 gives a push notification to the optical packet transponder 30 and the administrator terminal 40, and thus the key can be updated at an appropriate timing at which delay is inhibited although not in real time.

In addition, when the XKD device 20 generates the key K by OKD, the administrator can be notified of a detection result of intercepting or wiretapping.

Quantum key exchange (QKD) also has a low throughput (for example, there is often only a throughput at a kbps level). Therefore, while constant key exchange is required to pool keys, in post-quantum key exchange (PQKD), keys can be exchanged on an on-demand basis in response to a request from a network device or apparatus (in the embodiment, the optical packet transponder 30). In general, in order to implement key pooling, the key exchange device (in the embodiment, the XKD device 20) is required to have a database, and work for studying and implementing such a database are needed. However, by deploying the foregoing inter-optical device connection server 10, the inter-optical device connection server 10 functions as a buffer, and thus it is not necessary to study or implement a database. In this way, one of the main features of the key exchange system 1 according to the embodiment is that the key exchange system 1 includes an intermediate server (the inter-optical device connection server 10) that functions as a buffer that is compatible with the characteristics of each key exchange device.

In the embodiment, the optical packet transponder 30 is assumed as an example of the network device or apparatus, but the present invention is not limited thereto, and it goes without saying that any network device or apparatus may be used. Furthermore, in this case, the inter-optical device connection server 10 may be referred to as, for example, "inter-network device connection server", simply "server", "intermediate server", or the like.

REFERENCE LITERATURE

Reference Literature 1: Post-Quantum Cryptography|CSRC, Internet <URL: https://csrc.nist.gov/Projects/post-quantum-cryptography/round-3-submissions>

The present invention is not limited to the foregoing specifically disclosed embodiment, and various modifications and changes, combinations with known technologies, and the like can be made without departing from the scope of the claims.

REFERENCE SIGNS LIST

1 Key exchange system
10 Inter-optical device connection server
11 External I/F
11a Recording medium
12 Communication I/F
13 Processor
14 Memory device
15 Bus
20 XKD device
30 Optical packet transponder
40 Administrator terminal
50 Communication path
60 Communication path
101 State monitoring unit
102 Push notification unit
103 Key exchange process unit
110 TEE
120 RoT
200 SE
201 Key exchange process unit
300 SE
301 Key exchange process unit
302 Encrypted communication unit

The invention claimed is:

1. A key exchange system comprising:
a processor; and
a memory storing executable commands that, when executed on the processor, cause the key exchange system to:
act as a key generation device, including generating a key based on quantum key exchange or post-quantum key exchange;
act as a network device, including performing encrypted communication with another network device by using the key; and
act as an intermediate server deployed between the key generation device and the network device, including:
transmitting a state monitoring request to the key generation device at each predetermined time;
giving a push notification of key information included in a response to the state monitoring request, to the network device, when the response is received; and
starting key exchange between the network device and the key generation device in response to a request from the network device having received the push notification of the key information,
wherein the intermediate server supports a trusted execution environment, and
wherein key exchange is performed between the network device and the key generation device via remote attestation, which is a secure channel with an enclave indicating a secure area provided by the trusted execution environment.

2. The key exchange system according to claim 1,
wherein the key exchange system further acts as an administrator terminal for use by an administrator of the key generation device and the network device, and
wherein the push notification of the key information is given to the administrator terminal.

3. The key exchange system according to claim 2,
wherein the key is generated based on quantum key exchange, and
wherein the push notification of the key information and information indicating a result of wiretapping or intercepting detection are given to the administrator terminal.

4. A method used in a key exchange system including a processor, and a memory storing executable commands that, when executed on the processor, cause the key exchange system to perform the method, including:
acting as a key generation device, including generating a key based on quantum key exchange or post-quantum key exchange;

acting as a network device, including performing encrypted communication with another network device by using the key; and acting as an intermediate server deployed between the key generation device and the network device, including:

transmitting a state monitoring request to the key generation device at each predetermined time;

giving a push notification of key information included in a response to the state monitoring request to the network device when the response is received; and starting key exchange between the network device and the key generation device in response to a request from the network device having received the push notification of the key information, wherein the intermediate server supports a trusted execution environment, and wherein key exchange is performed between the network device and the key generation device via remote attestation, which is a secure channel with an enclave indicating a secure area provided by the trusted execution environment.

5. A non-transitory computer-readable recording medium storing a program that causes a computer to perform a method, said method comprising:

acting as a key generation device, including generating a key based on quantum key exchange or post-quantum key exchange;

acting as a network device, including performing encrypted communication with another network device by using the key; and acting as an intermediate server deployed between the key generation device and the network device, including:

transmitting a state monitoring request to the key generation device at each predetermined time;

giving a push notification of key information included in a response to the state monitoring request to the network device when the response is received; and starting key exchange between the network device and the key generation device in response to a request from the network device having received the push notification of the key information, wherein the intermediate server supports a trusted execution environment, and wherein key exchange is performed between the network device and the key generation device via remote attestation, which is a secure channel with an enclave indicating a secure area provided by the trusted execution environment.

* * * * *